United States Patent
Lang

(10) Patent No.: US 8,090,518 B2
(45) Date of Patent: Jan. 3, 2012

(54) METHOD AND DEVICE FOR OPERATING A DRIVE SYSTEM

(75) Inventor: Holger Lang, Regensburg (DE)

(73) Assignee: Continental Automotive GmbH, Hannover (DE)

(*) Notice: Subject to any disclaimer, the term of this patent is extended or adjusted under 35 U.S.C. 154(b) by 979 days.

(21) Appl. No.: 12/040,139

(22) Filed: Feb. 29, 2008

(65) Prior Publication Data

US 2008/0243347 A1  Oct. 2, 2008

(30) Foreign Application Priority Data

Mar. 12, 2007  (DE) .................. 10 2007 011 812

(51) Int. Cl.
*G06F 19/00* (2011.01)

(52) U.S. Cl. ........ 701/102; 701/101; 701/110; 701/103; 123/339.11; 123/403; 123/406.33; 123/184.21

(58) Field of Classification Search .................. 701/101, 701/102, 103, 110; 123/339.1, 339.11, 339.14, 123/345, 403, 406.11, 406.12, 406.23, 406.33, 123/406.52, 674, 184.24
See application file for complete search history.

(56) References Cited

U.S. PATENT DOCUMENTS

| | | | | |
|---|---|---|---|---|
| 5,579,736 A * | 12/1996 | Nakamura et al. | ........ | 123/339.11 |
| 6,014,955 A * | 1/2000 | Hosotani et al. | ............ | 123/399 |
| 6,125,821 A * | 10/2000 | Zhang | ............ | 123/350 |
| 6,237,563 B1 * | 5/2001 | Froehlich et al. | ............ | 123/350 |
| 6,302,081 B1 * | 10/2001 | Moser et al. | ............ | 123/295 |
| 6,446,596 B1 * | 9/2002 | Moser et al. | ............ | 123/295 |
| 7,062,372 B2 | 6/2006 | Hartmann et al. | ............ | 701/110 |
| 7,200,508 B2 * | 4/2007 | Geyer et al. | ............ | 702/96 |
| 2001/0002090 A1 * | 5/2001 | Frohlich et al. | ............ | 290/40 R |
| 2003/0168036 A1 * | 9/2003 | Kustosch et al. | ............ | 123/295 |
| 2005/0021219 A1 * | 1/2005 | Hartmann et al. | ............ | 701/110 |
| 2005/0071073 A1 * | 3/2005 | Ueda et al. | ............ | 701/101 |
| 2006/0200298 A1 * | 9/2006 | Jehle | ............ | 701/104 |
| 2007/0289564 A1 * | 12/2007 | Dingl et al. | ............ | 123/90.17 |
| 2008/0255751 A1 * | 10/2008 | Hsu et al. | ............ | 701/103 |
| 2009/0090572 A1 * | 4/2009 | Huber et al. | ............ | 180/65.28 |
| 2009/0101125 A1 * | 4/2009 | Hsu et al. | ............ | 123/681 |
| 2010/0299046 A1 * | 11/2010 | Roduner et al. | ............ | 701/103 |

FOREIGN PATENT DOCUMENTS

| | | |
|---|---|---|
| DE | 199 39 820 A1 | 2/2001 |
| DE | 102 33 578 A1 | 2/2004 |
| DE | 10 2004 038 338 B3 | 4/2006 |

* cited by examiner

*Primary Examiner* — Thomas Black
*Assistant Examiner* — Ce Li
(74) *Attorney, Agent, or Firm* — King & Spalding L.L.P.

(57) ABSTRACT

In a first operating mode, as a function of the determined torque request value at least one first final control element is actuated influencing an air path of an engine. Representative of an actual basic torque value, a specific engine characteristic value is determined as a function of which, a filter parameter value is determined such that a torque setpoint value is brought closer to the actual basic torque value. The filter parameter value is saved assigned to the specific characteristic value. In a second operating mode, the filter parameter value is determined as a function of the specific characteristic value and the setpoint torque value is predefined by filtering the driver-requested torque value as a function of the determined parameter value. As a function of the predefined setpoint torque value, at least one second final control element is actuated which influences the drive system torque outside the air path.

10 Claims, 2 Drawing Sheets

METHOD AND DEVICE FOR OPERATING A DRIVE SYSTEM

CROSS-REFERENCE TO RELATED APPLICATIONS

This application claims priority to German Patent Application Number 10 2007 011 812.2 filed on Mar. 12, 2007, and which is incorporated herein by reference in its entirety.

TECHNICAL FIELD

The invention relates to a method and a device for operating a drive system.

BACKGROUND

A method and a device for controlling an operating variable of an internal combustion engine are known from DE 199 39 820 A1. During normal operation, control of the internal combustion engine takes place in accordance with a setpoint value which was formed as a function of at least one setpoint value for the torque of the internal combustion engine. The operating variable is controlled independently of this setpoint value in accordance with a predefined initial setpoint value. With reference to an air path of the internal combustion engine, a torque setpoint value is converted, taking into consideration physical conditions in the induction manifold and properties of the throttle valve, into a throttle valve position setpoint value which is adjusted by way of a position control means. A torque setpoint value for a fast intervention path is converted into an ignition angle or fuel delivery correction taking into consideration the torque of the drive unit.

A method and a device for controlling an internal combustion engine are known from DE 10 2004 038 338 B3. A desired air mass flow into a combustion chamber of a cylinder is determined as a function of a driver-requested load requirement. The desired air mass flow is set by varying a phase between a camshaft and a crankshaft if the desired air mass flow can be set by varying the phase, whilst substantially maintaining an effective pressure difference upstream and downstream of the throttle valve. Otherwise, the desired air mass flow is set by varying the opening angle of the throttle valve. A driver-requested torque can preferably be an air path torque and consequently that torque which is set by appropriate variation of final control elements, by means of which the air delivery into the respective cylinders can be set.

SUMMARY

A method and a device for operating a drive system can be provided which contribute toward making the drivability of a motor vehicle which includes the drive system independent of an operating mode of the drive system. According to an embodiment, a method for operating a drive system comprising at least an internal combustion engine and being arranged in a motor vehicle for the purpose of driving the motor vehicle, may comprise the steps of:—determining a value for a driver-requested torque for a driver of the motor vehicle, and wherein in a first operating mode of the drive system, the method comprises the steps of:—determining a first control signal as a function of the value determined for the driver-requested torque,—in order to realize the driver-requested torque as a function of the determined first control signal, actuating at least one first final control element which influences an air path of the internal combustion engine,—determining a specific value for a characteristic of the internal combustion engine which is representative of an actual value for a basic torque which is actually produced by the internal combustion engine based on a setting of the first final control element,—as a function of the specific value for the characteristic, determining a parameter value for a filter in such a way that a setpoint value for the torque which is determined by filtering the value for the driver-requested torque as a function of the determined parameter value is brought closer to the actual value for the basic torque,—saving the parameter value for the filter assigned to the specific value for the characteristic, and wherein in a second operating mode of the drive system, the method comprises the steps of:—determining the specific value for the characteristic,—determining the parameter value for the filter as a function of the specific value for the characteristic,—predefining the setpoint value for the torque by filtering the value for the driver-requested torque as a function of the determined parameter value,—determining at least one second control signal as a function of the predefined setpoint value for the torque,—in order to realize the predefined setpoint value for the torque as a function of the second control signal, actuating at least one second final control element which influences the torque produced by the drive system outside the air path.

According to a further embodiment, the first operating mode of the drive system may involve homogeneous operation of the internal combustion engine. According to a further embodiment, the drive system may comprise an electric motor.

According to a further embodiment, the second operating mode may involve operation of the electric motor.

According to another embodiment, a device for operating a drive system which comprises at least an internal combustion engine and which may be arranged in a motor vehicle for the purpose of driving the motor vehicle, wherein the device may be operable to determine a value for a driver-requested torque for a driver of the motor vehicle and, in a first operating mode of the drive system,—to determine a first control signal as a function of the value determined for the driver-requested torque,—in order to realize the driver-requested torque as a function of the first control signal determined, to actuate at least one first final control element which influences an air path of the internal combustion engine,—to determine a specific value for a characteristic of the internal combustion engine which is representative of an actual value for a basic torque which is actually produced by the internal combustion engine based on a setting of the first final control element,—as a function of the specific value for the characteristic, to determine a parameter value for a filter in such a way that a setpoint value for the torque which is determined by filtering the value for the driver-requested torque as a function of the determined parameter value, corresponds to the actual value for the basic torque, to save the parameter value for the filter, assigned to the specific value for the characteristic, and wherein, in a second operating mode of the drive system, the device is operable:—to determine the specific value for the characteristic,—as a function of the specific value for the characteristic, to determine the parameter value for the filter,—to predefine the setpoint value for the torque by filtering the value for the driver-requested torque as a function of the determined parameter value,—to determine at least one second control signal as a function of the predefined setpoint value for the torque,—to actuate at least one second final control element which does not act on the air path of the internal combustion engine in order to realize the predefined setpoint value for the torque as a function of the second control signal.

According to a further embodiment, the filter may comprise a higher-order low-pass filter. According to a further embodiment, the device may comprise a regulator by means of which the parameter value is regulated in such a way in the first operating mode of the internal combustion engine that the setpoint value for the torque is brought closer to the actual value for the basic torque.

BRIEF DESCRIPTION OF THE DRAWINGS

The invention will be explained in more detail in the following with reference to schematic drawings, in which.

DETAILED DESCRIPTION

Figure 1:
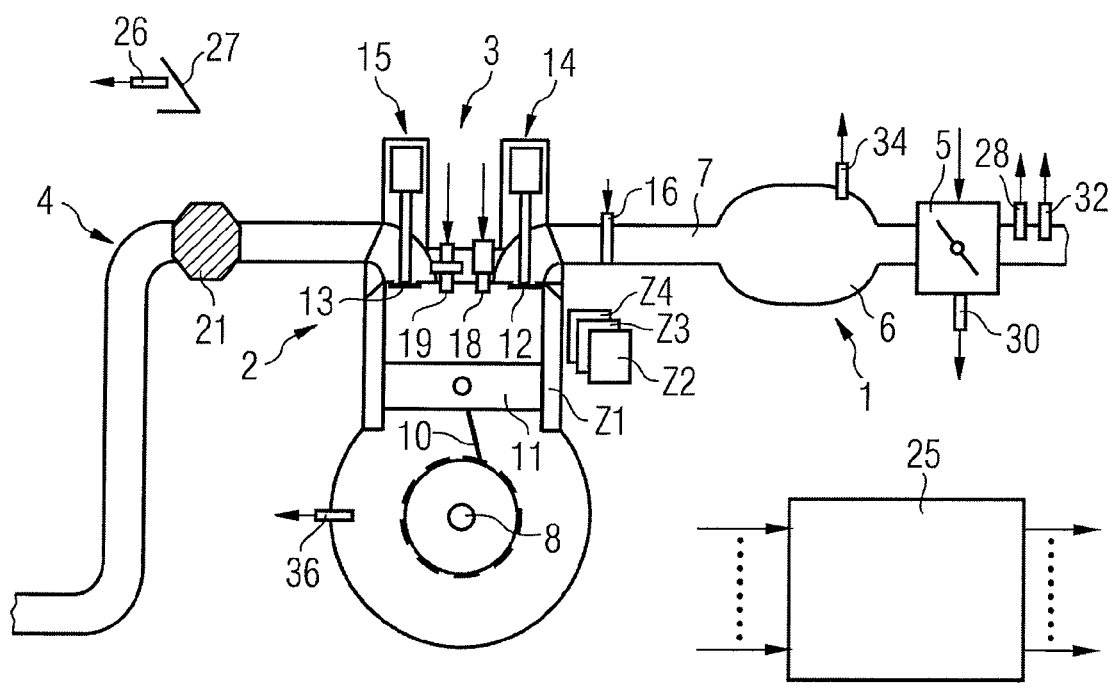
FIG. 1 shows an internal combustion engine.

According to an embodiment, the drive system may comprise at least an internal combustion engine and is disposed in a motor vehicle for the purpose of driving the motor vehicle. A value for a driver-requested torque for a driver of the motor vehicle is determined. In a first operating mode of the drive system a first control signal is determined based on the value determined for the driver-requested torque. In order to realize the driver-requested torque, at least one first final control element is actuated as a function of the first control signal determined. The first final control element influences an air path of the internal combustion engine. A specific value for a characteristic of the internal combustion engine is determined. The specific value for the characteristic is representative of an actual value for a basic torque which is actually produced by the internal combustion engine based on a setting of the first final control element. As a function of the specific value for the characteristic, a parameter value for a filter is determined in such a way that a setpoint value for the torque, which is determined by filtering the value for the driver-requested torque as a function of the determined parameter value, is brought closer to the actual value for the basic torque. The parameter value for the filter is saved assigned to the specific value for the characteristic. In a second operating mode of the drive system the specific value for the characteristic is determined. As a function of the specific value for the characteristic, the parameter value for the filter is determined. The setpoint value for the torque is predefined by filtering the value for the driver-requested torque as a function of the determined parameter value. As a function of the predefined setpoint value for the torque, at least one second control signal is determined. In order to realize the predefined setpoint value for the torque, at least one second final control element is actuated based on the second control signal. The second final control element influences the torque produced by the drive system outside the air path.

This contributes toward making the drivability and/or the dynamic behavior of a motor vehicle which includes the drive system independent of the operating mode of the drive system. The same drivability or dynamic behavior in different operating modes means in this context that, irrespective of the operating mode of the drive system, the driver always obtains the same or at least a similar response from the drive system when a driver-requested torque is predefined at a predefined load level. The air path can also be referred to as a slow path because the setting of the torque by way of the air path is slower than the setting of the torque by way of a fast path, for example by way of an ignition point and by way of an injection mass. From the physical point of view, the air path is the part of the intake tract which lies between an air inlet for the intake of ambient air and a gas inlet valve of the internal combustion engine in the direction of flow. From the functional point of view, the air path includes all the final control elements which have an effect on an air mass flow through to the combustion chamber of the internal combustion engine. The air path thus includes for example a throttle valve, a pulse charging valve of the internal combustion engine and/or a switching valve for changing an effective induction manifold length. The first final control element acts on the air path and thus preferably on the air mass flow through the air path and includes for example the throttle valve of the internal combustion engine. The second final control element acts not on the air path but on the fast path. The second final control element includes for example a spark plug, an injection valve and/or a final control element of an electric motor of the drive system.

According to a further embodiment, the first operating mode of the drive system involves homogeneous operation of the internal combustion engine. This contributes toward making the operation of the drive system extremely efficient overall.

According to a further embodiment, the drive system comprises an electric motor. In this context the adaptation of the actual value for the basic torque contributes particularly effectively toward realizing the same drivability irrespective of the operating mode, because the dynamic behavior of the electric motor is basically different from that of the internal combustion engine.

According to a further embodiment, the second operating mode involves operation of the electric motor. In this context the adaptation of the actual value for the basic torque contributes particularly effectively towards realizing the same drivability because the dynamic behavior of the electric motor is basically different to that of the internal combustion engine.

According to a further embodiment, the filter comprises a higher-order low-pass filter. This makes it possible in a simple manner also to exhibit the same drivability outside of homogeneous operation as in homogeneous operation.

According to a further embodiment, the device comprises a regulator, by means of which the parameter value is regulated in such a way in the first operating mode of the internal combustion engine that the setpoint value for the torque is brought closer to the actual value for the basic torque. This contributes to a precise adaptation of the parameter values.

Elements having the same construction or function are identified by the same reference characters in all the figures.

An internal combustion engine BKM (FIG. 1, FIG. 3) comprises an intake tract 1, an engine block 2, a cylinder head 3 and an exhaust gas tract 4. The intake tract 1 preferably may comprise a throttle valve 5, a plenum 6 and an induction manifold 7 which is routed to a cylinder Z1 by way of an inlet port into a combustion chamber of the engine block 2. The engine block 2 also comprises a crankshaft 8 which is coupled by way of a connecting rod 10 to the piston 11 of the cylinder Z1. In addition to the cylinder Z1, the internal combustion engine BKM comprises at least one further cylinder Z2, preferably however further cylinders Z3, Z4, but it can also comprise any desired greater number of cylinders Z1-Z4. The internal combustion engine BKM can preferably be disposed in a motor vehicle.

The cylinder head 3 comprises a valve operating mechanism 14, 15 which is coupled to a gas inlet valve 12 and a gas outlet valve 13 respectively. The valve operating mechanism 14, 15 comprises at least one camshaft which is coupled to the crankshaft 8. A pulse charging valve 16 can be disposed in the intake tract 1. Also disposed in the cylinder head 3 may preferably be an injection valve 18 and, unless the internal combustion engine BKM is a diesel internal combustion engine, a spark plug 19. Alternatively, the injection valve 18 can also be disposed in the induction manifold 7. An exhaust gas catalytic converter 21, which can preferably be implemented as a three-way catalytic converter, is disposed in the exhaust gas tract 4.

A control device 25 is provided, to which sensors are assigned that sense different measured variables and determine the measured value of each measured variable. As a function of at least one of the measured variables, the control device 25 determines correcting variables which are then converted into one or more control signals for controlling the final control elements by means of appropriate actuators. In addition, the control device 25 determines specific values of characteristics. The characteristics can be measured variables or variables derived therefrom. The control device 25 can also be referred to as a device for controlling the internal combustion engine BKM and/or as an engine controller.

The sensors are for example a pedal position sensor 26 which senses an accelerator pedal position of an accelerator pedal 27, an air mass sensor 28 which senses an air mass flow upstream of the throttle valve 5, a temperature sensor 32 which senses an intake air temperature, a throttle valve position sensor 30 which senses an opening angle of the throttle valve 5, an induction manifold pressure sensor 34 which senses an actual value MAP_AV for an induction manifold pressure in the plenum 6, a crankshaft angle sensor 36 which senses a crankshaft angle, to which a rotational speed of the internal combustion engine BKM is then assigned.

According to various embodiments, any subset of the aforementioned sensors may be present or additional sensors may also be present.

The final control elements are for example the throttle valve 5, the gas inlet and gas outlet valves 12, 13, the pulse charging valve 16, the injection valve 18 and/or the spark plug 19.

The final control elements and sensors can in each case simply be assigned to one cylinder Z1-Z4 and/or in each case to a plurality of cylinders Z1-Z4. If a final control element and/or a sensor is assigned to a plurality of cylinders Z1-Z4, the control signals or measured values for the final control element or from the sensor are assigned to the individual cylinders Z1-Z4 as a function of the crankshaft angle for example.

Figure 2:
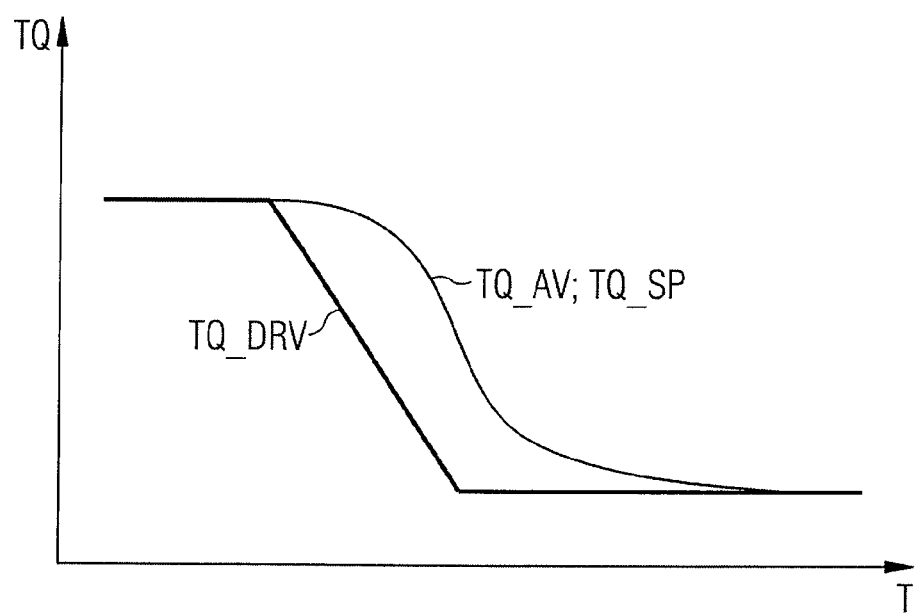
FIG. 2 shows a torque timing diagram.

A torque timing diagram (FIG. 2) has a time axis T and a torque axis TQ. The torque-timing diagram shows a profile for a value TQ_DRV for a driver-requested torque. The driver-requested torque is predefined for example by a driver of the motor vehicle by way of the accelerator pedal position of the accelerator pedal 27. According to the torque-timing diagram the value TQ_DRV for the driver-requested torque falls in linear fashion. In a first operating mode of the internal combustion engine BKM, which can be preferably homogeneous operation of the internal combustion engine BKM, a torque actually produced by the internal combustion engine BKM is essentially set by way of an air path of the internal combustion engine BKM. From the physical point of view, the air path comprises that part of the intake tract 1 which lies between an air inlet for the intake of ambient air and the gas inlet valve 12, the throttle valve 5 and the pulse charging valve 16. From the functional point of view, the air path comprises the throttle valve 5 and the pulse charging valve 16. If the torque of the internal combustion engine BKM is set by way of the air path, then the torque is set by a change in position of the throttle valve 5 and/or of the pulse charging valve 16. Since the adjustment of the throttle valve 5 or the pulse charging valve 16 acts on the torque actually produced by the internal combustion engine BKM occurs only after a time delay, the air path is also called the slow path. The delay results from the fact that an air mass which is required in order to represent the increased or reduced torque must first be drawn in or expelled before precisely the air mass which is needed in the chamber in order to produce the desired torque is available.

A basic torque is produced by the internal combustion engine on the basis of the position of a first final control element which influences the air path. The torque actually produced by the internal combustion engine BKM can differ from the torque produced on the basis of the position of the first final control element if in addition to the first final control element a second final control element is actuated which influences the torque actually produced by the internal combustion engine BKM independently of the air path.

If the value TQ_DRV for the driver-requested torque is now simply set by way of the air path, then a profile of an actual value TQ_AV for the basic torque follows the profile of the value TQ_DRV for the driver-requested torque with a delay and with a blurring of the edges of the graph.

If the drive system is operated in a second operating mode, for example stratification operation of the internal combustion engine BKM and/or for example if the drive system of the motor vehicle comprises an electric motor E_MOT, then the driver of the motor vehicle should obtain the same response from the drive system to a change in the value TQ_DRV for the driver-requested torque at every load level of the drive system as during homogeneous operation of the internal combustion engine BKM. Therefore, in homogeneous operation of the internal combustion engine BKM the value TQ_DRV for the driver-requested torque is filtered such that the filtered value TQ_DRV for the driver-requested torque corresponds at least approximately to the actual value TQ_AV for the basic torque. A parameter value PAR which is used for filtering the value TQ_DRV for the driver-requested torque is adapted in the first operating mode, preferably homogeneous operation, to suit the current load level of the drive system and used outside of homogeneous operation in order to determine a setpoint value TQ_SP for the torque. The load level is determined essentially by determining a value for a load variable. The load variable is for example the induction manifold pressure and/or an air mass flow through to the combustion chamber.

Figure 3:
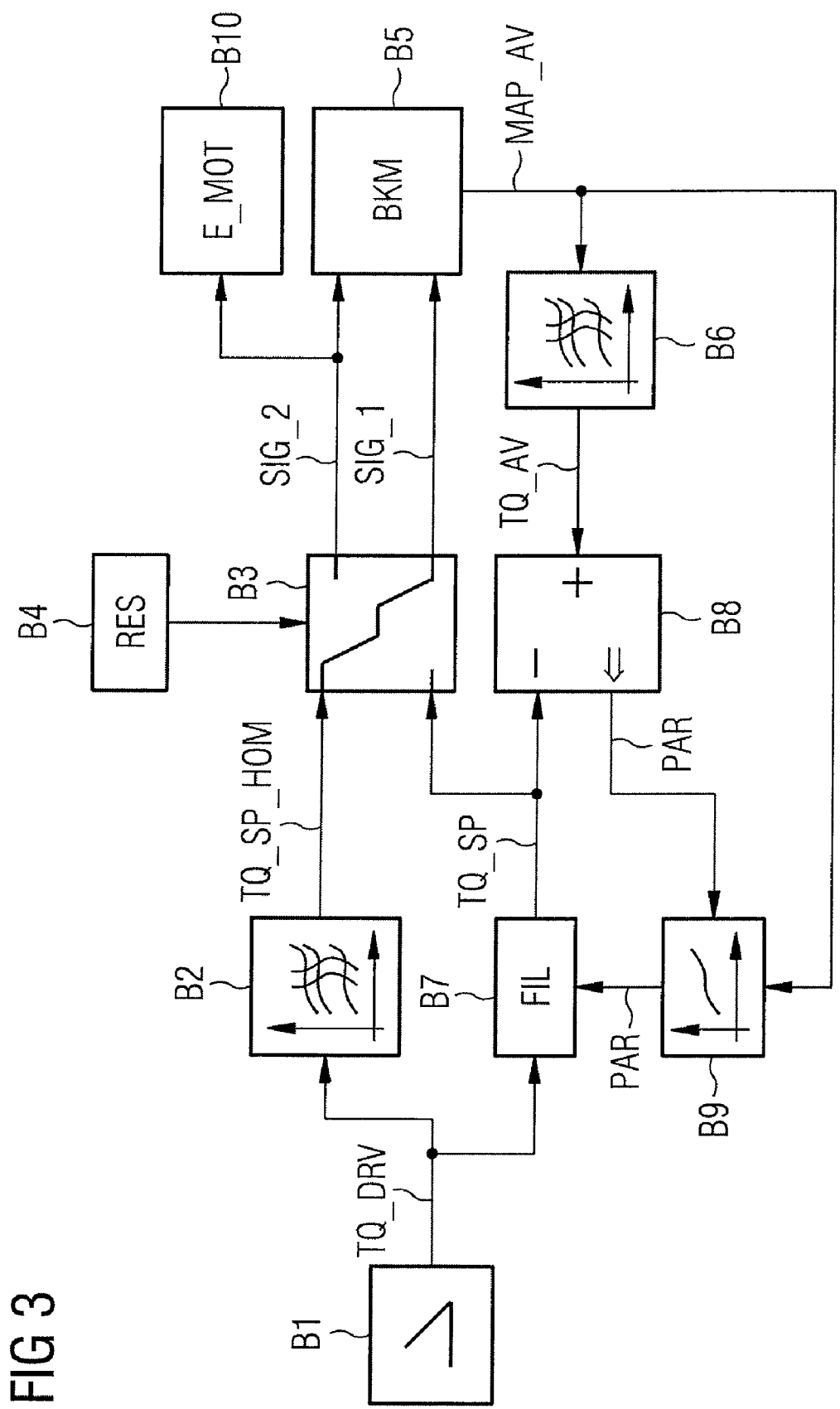
FIG. 3 shows a device for operating a drive system.

The drive system preferably may include a device for operating the drive system (FIG. 3).

The device for operating the drive system comprises a block B1 which is representative of the accelerator pedal 27. Depending on the accelerator pedal position of the accelerator pedal 27, the value TQ_DRV for the driver-requested torque is determined in the block B1. During homogeneous operation of the internal combustion engine BKM the value TQ_DRV for the driver-requested torque is processed further by the blocks B2 and B7.

In the block B2, a setpoint value TQ_SP_HOM for the torque for homogeneous operation is determined on the basis of a torque model as a function of the value TQ_DRV for the driver-requested torque.

In a block B3, at least one first control signal SIG_1 is determined as a function of the setpoint value TQ_SP_HOM for the torque for homogeneous operation. The first control signal SIG_1 serves to actuate a first final control element of the internal combustion engine BKM which influences the air path of the internal combustion engine BKM. The first final control element comprises for example the throttle valve 5 and/or the pulse charging valve 16. The switch setting of block B3 can be varied as a function of the current operating mode and/or as a function of the current operating point. In addition, both control signals can be generated as a function of one of the setpoint values.

In a block B4, a torque reserve RES can be determined which can be held in readiness and made available by way of the air path and accessed or destroyed by way of the fast path.

A block B5 represents the internal combustion engine BKM which comprises the first final control element. For example, the actual value MAP_AV for the induction manifold pressure of the internal combustion engine BKM is determined by means of the induction manifold pressure sensor 34. In this context, the actual value MAP_AV for the induction manifold pressure can be referred to as the specific value and the induction manifold pressure can be referred to as the characteristic. As an alternative to the actual value MAP_AV for the induction manifold pressure, it is also possible to use an actual value for the air mass flow through to the combustion chamber.

As a function of the actual value MAP_AV for the induction manifold pressure, the actual value TQ_AV for the basic torque can be determined in a block B6 on the basis of a characteristic map for example. The characteristic map and if applicable further characteristic maps can for example be recorded on an engine test bench. The actual value TQ_AV for the basic torque can also be determined if the torque actually produced by the internal combustion engine differs from the basic torque. The actual value TQ_AV for the basic torque can be determined directly as a function of the actual value MAP_AV for the induction manifold pressure or as a function of a pressure quotient which is determined as a function of the actual value MAP_AV for the induction manifold pressure.

A block B7 represents a filter FIL which preferably may comprise a higher-order low-pass filter. For example, the low-pass filter is a PT1 or a PT2 filter to which a dead time can be applied. The parameter value PAR comprises for example one or more time constants of the low-pass filter and/or the dead time of the low-pass filter and/or at least one parameter value PAR which is representative of the time constant. In the first operating mode, in the block B7 the value TQ_DRV for the driver-requested torque is filtered as a function of a parameter value PAR in such a way that the filtered value TQ_DRV for the driver-requested torque can be predefined outside the first operating mode as the setpoint value TQ_SP for the torque. In other words, the setpoint value TQ_SP for the torque is used for controlling the drive system only outside of homogeneous operation.

During homogeneous operation, in a block B8 the parameter value PAR is regulated such that a difference between the actual value TQ_AV for the basic torque and the setpoint value TQ_SP for the torque is as small as possible, for example less than a predefined threshold value. In other words, the parameter value PAR is predefined such that the setpoint value TQ_SP for the torque is brought close to the actual value TQ_AV for the basic torque.

The parameter value PAR determined is saved in a block B9, assigned to the actual value MAP_AV for the induction manifold pressure. The actual value MAP_AV for the induction manifold pressure represents a load state of the internal combustion engine BKM. A corresponding parameter value PAR is thus assigned to each load state of the internal combustion engine BKM in homogeneous operation. Outside of homogeneous operation the control device 25 can thus assign the appropriate parameter value PAR to each load level, particularly to each actual value MAP_AV for the induction manifold pressure, and filter the value TQ_DRV for the driver-requested torque as a function of the parameter value PAR such that the drive system responds in exactly the same manner as it would respond during homogeneous operation of the internal combustion engine BKM at the same load level, particularly in the case of the same induction manifold pressure. In other words, during homogeneous operation of the internal combustion engine BKM the parameter value PAR is adapted and is used outside of homogeneous operation in order to determine the setpoint value TQ_SP.

Outside the first operating mode, for example in the second operating mode, particularly during operation of the electric motor E_MOT and/or during stratification operation of the internal combustion engine BKM, in the block B3 at least one second control signal SIG_2 is determined for a second final control element, as a function of the setpoint value TQ_SP for the torque. The second final control element influences a torque produced by the drive system outside the air path. For example, the adjustment of the second final control element has an effect on the fast path of the internal combustion engine BKM. To this end the second final control element comprises for example the spark plug 19 and/or the injection valve 18. Alternatively, or in addition, the second final control element can comprise a final control element of the electric motor E_MOT. Compared with the air path, the adjustment of the second final control element acts on the torque produced by the internal combustion engine BKM almost without a time delay. A profile of the actual value for the torque actually produced by the drive system consequently almost matches the profile of the setpoint value TQ_SP for the torque. The same drivability is thus available to the driver of the motor vehicle in every operating mode of the internal combustion engine BKM, particularly at every load level of the internal combustion engine BKM. In other words, the drive system exhibits the same dynamic behavior in all operating modes.

The invention is not restricted to the cited embodiments. For example, the device for operating the drive system can comprise further components. Alternatively, components of the device can be divided up differently, for example partially integrated into one another and/or integrated into higher-order components.

What is claimed is:

1. A method for operating a drive system comprising at least an internal combustion engine and being arranged in a motor vehicle for the purpose of driving the motor vehicle, the method comprising the steps of:

determining a value for a driver-requested torque for a driver of the motor vehicle, and wherein in a first operating mode of the drive system, the method comprises the steps of:

determining a first control signal as a function of the value determined for the driver-requested torque, in order to realize the driver-requested torque as a function of the determined first control signal, actuating at least one first final control element which influences an air path of the internal combustion engine, determining a specific value for a characteristic of the internal combustion engine which is representative of an actual value for a basic torque which is actually produced by the internal combustion engine based on a setting of the first final control element, as a function of the specific value for the characteristic, determining a parameter value for a filter in such a way that a setpoint value for the torque which is determined by filtering the value for the driver-requested torque as a function of the determined parameter value is brought closer to the actual value for the basic torque, saving the parameter value for the filter assigned to the specific value for the characteristic, and wherein in a second operating mode of the drive system, the method comprises the steps of:
- determining the specific value for the characteristic,
- determining the parameter value for the filter as a function of the specific value for the characteristic,
- predefining the setpoint value for the torque by filtering the value for the driver-requested torque as a function of the determined parameter value,
- determining at least one second control signal as a function of the predefined setpoint value for the torque,
- in order to realize the predefined setpoint value for the torque as a function of the second control signal, actuating at least one second final control element which influences the torque produced by the drive system outside the air path.

2. The method according to claim 1, wherein the first operating mode of the drive system involves homogeneous operation of the internal combustion engine.

3. The method according to claim 1, wherein the drive system comprises an electric motor.

4. The method according to claim 3, wherein the second operating mode involves operation of the electric motor.

5. A device for operating a drive system which comprises at least an internal combustion engine and which is arranged in a motor vehicle for the purpose of driving the motor vehicle, wherein the device is operable to determine a value for a driver-requested torque for a driver of the motor vehicle and, in a first operating mode of the drive system,
- to determine a first control signal as a function of the value determined for the driver-requested torque,
- in order to realize the driver-requested torque as a function of the first control signal determined, to actuate at least one first final control element which influences an air path of the internal combustion engine,
- to determine a specific value for a characteristic of the internal combustion engine which is representative of an actual value for a basic torque which is actually produced by the internal combustion engine based on a setting of the first final control element,
- as a function of the specific value for the characteristic, to determine a parameter value for a filter in such a way that a setpoint value for the torque which is determined by filtering the value for the driver-requested torque as a function of the determined parameter value, corresponds to the actual value for the basic torque,
- to save the parameter value for the filter, assigned to the specific value for the characteristic, and wherein, in a second operating mode of the drive system, the device is operable:
- to determine the specific value for the characteristic,
- as a function of the specific value for the characteristic, to determine the parameter value for the filter,
- to predefine the setpoint value for the torque by filtering the value for the driver-requested torque as a function of the determined parameter value,
- to determine at least one second control signal as a function of the predefined setpoint value for the torque,
- to actuate at least one second final control element which does not act on the air path of the internal combustion engine in order to realize the predefined setpoint value for the torque as a function of the second control signal.

6. The device according to claim 5, wherein the filter comprises a higher-order low-pass filter.

7. The device according to claim 5, which comprises a regulator by means of which the parameter value is regulated in such a way in the first operating mode of the internal combustion engine that the setpoint value for the torque is brought closer to the actual value for the basic torque.

8. A device for operating a drive system comprising:
- at least an internal combustion engine, wherein the device is operable to determine a value for a driver-requested torque for a driver of the motor vehicle and, in a first operating mode of the drive system, comprising
- means to determine a first control signal as a function of the value determined for the driver-requested torque,
- in order to realize the driver-requested torque as a function of the first control signal determined, means to actuate at least one first final control element which influences an air path of the internal combustion engine,
- means to determine a specific value for a characteristic of the internal combustion engine which is representative of an actual value for a basic torque which is actually produced by the internal combustion engine based on a setting of the first final control element,
- as a function of the specific value for the characteristic, means to determine a parameter value for a filter in such a way that a setpoint value for the torque which is determined by filtering the value for the driver-requested torque as a function of the determined parameter value, corresponds to the actual value for the basic torque,
- means to save the parameter value for the filter, assigned to the specific value for the characteristic, and wherein, in a second operating mode of the drive system, the device comprises:
- means to determine the specific value for the characteristic,
- as a function of the specific value for the characteristic, means to determine the parameter value for the filter,
- means to predefine the setpoint value for the torque by filtering the value for the driver-requested torque as a function of the determined parameter value,
- means to determine at least one second control signal as a function of the predefined setpoint value for the torque,
- means to actuate at least one second final control element which does not act on the air path of the internal combustion engine in order to realize the predefined setpoint value for the torque as a function of the second control signal.

9. The device according to claim 8, wherein the filter comprises a higher-order low-pass filter.

10. The device according to claim 8, comprising a regulator by means of which the parameter value is regulated in such a way in the first operating mode of the internal combustion engine that the setpoint value for the torque is brought closer to the actual value for the basic torque.

* * * * *